United States Patent
Hsiang et al.

(10) Patent No.: US 10,891,004 B2
(45) Date of Patent: Jan. 12, 2021

(54) ELECTRONIC DEVICE WITH ULTRASONIC TOUCH

(71) Applicant: Acer Incorporated, New Taipei (TW)

(72) Inventors: Jui-Chieh Hsiang, New Taipei (TW); Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/297,752

(22) Filed: Mar. 11, 2019

(65) Prior Publication Data
US 2020/0174595 A1    Jun. 4, 2020

(30) Foreign Application Priority Data
Nov. 29, 2018  (TW) .............................. 107142735 A

(51) Int. Cl.
G06F 3/043 (2006.01)
G06F 3/041 (2006.01)
G06F 3/0488 (2013.01)

(52) U.S. Cl.
CPC ............ G06F 3/043 (2013.01); G06F 3/0412 (2013.01); G06F 3/04886 (2013.01)

(58) Field of Classification Search
CPC ..... G06F 3/0412; G06F 3/043; G06F 3/04886
See application file for complete search history.

(56) References Cited

U.S. PATENT DOCUMENTS

| | | | |
|---|---|---|---|
| 8,576,183 B2 | 11/2013 | Rabenstein et al. | |
| 9,799,719 B2 | 10/2017 | Cok | |
| 10,466,844 B1* | 11/2019 | Tang | H04M 1/026 |
| 2014/0354608 A1* | 12/2014 | Kitchens, II | G06F 1/3215 345/204 |
| 2016/0062530 A1* | 3/2016 | Huppi | G06F 3/0412 345/177 |
| 2016/0116944 A1* | 4/2016 | Lee | G06F 1/1616 361/679.26 |
| 2016/0246396 A1* | 8/2016 | Dickinson | G06F 3/0412 |
| 2017/0186820 A1 | 6/2017 | Wang | |
| 2019/0095046 A1* | 3/2019 | Guo | G06F 3/0412 |

(Continued)

FOREIGN PATENT DOCUMENTS

| | | |
|---|---|---|
| CN | 106020540 | 10/2016 |
| CN | 106716641 | 5/2017 |
| CN | 106896963 | 6/2017 |

(Continued)

*Primary Examiner* — Stacy Khoo
(74) *Attorney, Agent, or Firm* — JCIPRNET

(57) ABSTRACT

An electronic device with ultrasonic touch is provided. The electronic device includes a display device, an ultrasonic transmission device, an ultrasonic reception device, a substrate, an ultrasonic controller, and a sensing circuit. The substrate is adjacent to the ultrasonic transmission device and the ultrasonic reception device. The ultrasonic controller generates a control signal. The ultrasonic transmission device generates an ultrasonic wave in a direction toward the substrate according to the control signal, and the ultrasonic reception device simultaneously receives the ultrasonic wave according to the control signal through the substrate and generates a sensing signal corresponding to the received ultrasonic wave. The sensing circuit determines a position whether a touch occurs according to the sensing signal to generate a touch signal.

6 Claims, 12 Drawing Sheets

(56) References Cited

U.S. PATENT DOCUMENTS

2019/0204991 A1* 7/2019 He .................. G06F 3/0412

FOREIGN PATENT DOCUMENTS

| CN | 107229900 | 10/2017 |
|----|-----------|---------|
| CN | 107291307 | 10/2017 |
| CN | 107368227 | 11/2017 |
| TW | 200820055 | 5/2008  |

* cited by examiner

ELECTRONIC DEVICE WITH ULTRASONIC TOUCH

CROSS-REFERENCE TO RELATED APPLICATION

This application claims the priority benefits of TW application serial no. 107142735, filed on Nov. 29, 2018. The entirety of the above-mentioned patent applications is hereby incorporated by reference herein and made a part of this specification.

BACKGROUND OF THE INVENTION

Field of the Invention

The disclosure relates to a display technique with a touch function, and in particular, to an electronic device with ultrasonic touch and a micro LED display.

Description of Related Art

As technology advances, digital display devices have evolved from the liquid crystal display (LCD) technology, the organic light emitting diode (OLED) display technology, to the micro LED display technology. With the micro LED technique, the LED is transformed from the original backlight device into a self-luminous display device, so that the display device can achieve effects such as a high brightness, a high contrast ratio, a wide viewing angle, low power consumption, etc. Therefore, in the display device adopting the micro LED technique, each LED is turned into a pixel point, which greatly increases the number of LED wafers used.

On the other hand, the display devices are also currently provided with the touch function to augment their applications. How to integrate the display device adopting the micro LED technique with the various touch techniques (e.g., capacitive touch, resistive touch, optical touch, ultrasonic touch techniques, etc.) has become one of the directions for research of the touch and display techniques.

SUMMARY OF THE INVENTION

The invention provides an electronic device with ultrasonic touch that combines the micro LED display technique and the ultrasonic touch technique with each other and integrates the circuits of the two techniques in the same semiconductor manufacturing process for saving the cost.

The electronic device of the invention includes a display device, an ultrasonic transmission device, an ultrasonic reception device, a substrate, an ultrasonic controller, and a sensing circuit. The display device is configured to display an image. The ultrasonic transmission device and the ultrasonic reception device are configured to be adjacent to the display device. The substrate is configured to be adjacent to the ultrasonic transmission device and the ultrasonic reception device. The ultrasonic controller is coupled to the ultrasonic transmission device and the ultrasonic reception device. The ultrasonic controller generates a control signal. The ultrasonic transmission device generates an ultrasonic wave in a direction toward the substrate according to the control signal, and the ultrasonic reception device simultaneously receives the ultrasonic wave according to the control signal through the substrate and generates a sensing signal corresponding to the received ultrasonic wave. The sensing circuit is coupled to the ultrasonic reception device to receive the sensing signal, and the sensing circuit determines a position where a touch occurs according to the sensing signal to generate a touch signal.

The electronic device of the invention includes a display device, an ultrasonic transmission device, an ultrasonic reception device, a substrate, an ultrasonic controller, and a sensing circuit. The display device is configured to display an image. The ultrasonic transmission device and the ultrasonic reception device are configured to be adjacent to the display device. The substrate is configured to be adjacent to the ultrasonic transmission device and the ultrasonic reception device. The ultrasonic controller is coupled to the ultrasonic transmission device and the ultrasonic reception device. The ultrasonic controller generates a first control signal at a first time point and generates a second control signal at a second time point. The first time point is different from the second time point. The ultrasonic transmission device generates an ultrasonic wave according to the first control signal. The ultrasonic reception device receives the ultrasonic wave according to the second control signal and generates a sensing signal corresponding to the received ultrasonic wave. The sensing circuit is coupled to the ultrasonic reception device to receive the sensing signal, and the sensing circuit determines a position where a touch occurs according to the sensing signal to generate a touch signal.

The electronic device of the invention includes a display device, an ultrasonic transmission device, an ultrasonic reception device, a substrate, a pattern, an ultrasonic controller, and a sensing circuit. The display device is configured to display an image. The ultrasonic transmission device and the ultrasonic reception device are configured to be adjacent to the display device. The substrate is configured to be adjacent to the ultrasonic transmission device and the ultrasonic reception device. The ultrasonic controller is coupled to the ultrasonic transmission device and the ultrasonic reception device. The pattern is configured between the substrate and the ultrasonic transmission device and the ultrasonic reception device. The ultrasonic controller is configured to generate a control signal to control the ultrasonic transmission device and the ultrasonic reception device. In a case where the substrate is not pressed, the ultrasonic wave passes through a gap in the pattern so that the ultrasonic reception device generates a sensing signal having a first value. In a case where the substrate is pressed, the ultrasonic reception device generates the sensing signal having a second value based on the pattern and the ultrasonic wave. The sensing circuit is coupled to the ultrasonic reception device to receive the sensing signal. The sensing circuit determines a position where a touch occurs according to whether the sensing signal is the first value or the second value to generate a touch signal.

Based on the above, the display device realized by the micro LED technique, the ultrasonic transmission device, and the ultrasonic reception device may be integrated with each other and manufactured in the same semiconductor manufacturing process. Therefore, in the embodiments of the invention, a plurality of methods are designed to control the ultrasonic transmission device and the ultrasonic reception device to realize ultrasonic touch without affecting the display device and meanwhile reduce the installation cost. In an embodiment, by simultaneously turning on the ultrasonic transmission device and the ultrasonic reception device, it is determined whether a touch occurs based on whether the energy of the ultrasonic wave is absorbed by the object to be detected (e.g., a finger, a touch stylus, etc.). In an embodiment, the ultrasonic transmission device and the ultrasonic reception device are designed to be turned on at different times. Due to deformation resulting from pressing on the glass substrate by the object to be detected, the transmission path of the ultrasonic wave is changed, which affects whether the ultrasonic reception device receives the ultrasonic wave emitted before a predetermined time. Thereby, it can be determined whether a touch occurs. In an embodiment, a pattern capable of causing diffraction or interference in the ultrasonic wave is disposed on the transmission path of the ultrasonic wave. Due to deformation resulting from pressing on the glass substrate by the object to be detected, the passage path is changed, and thereby, it can be determined whether the touch occurs based on the energy change of the ultrasonic wave.

To make the aforementioned more comprehensible, several embodiments accompanied with drawings are described in detail as follows.

DESCRIPTION OF THE EMBODIMENTS

In the embodiments of the invention, a display device realized by the micro LED technique, an ultrasonic transmission device, and an ultrasonic reception device may be integrated with each other and manufactured in the same semiconductor manufacturing process to thereby reduce the installation cost. Therefore, in the embodiments of the invention, a plurality of methods are designed to control the ultrasonic transmission device and the ultrasonic reception device to realize ultrasonic touch without affecting the display device. Relevant embodiments conforming to the invention will be described below with reference to the drawings.

Figure 1A:
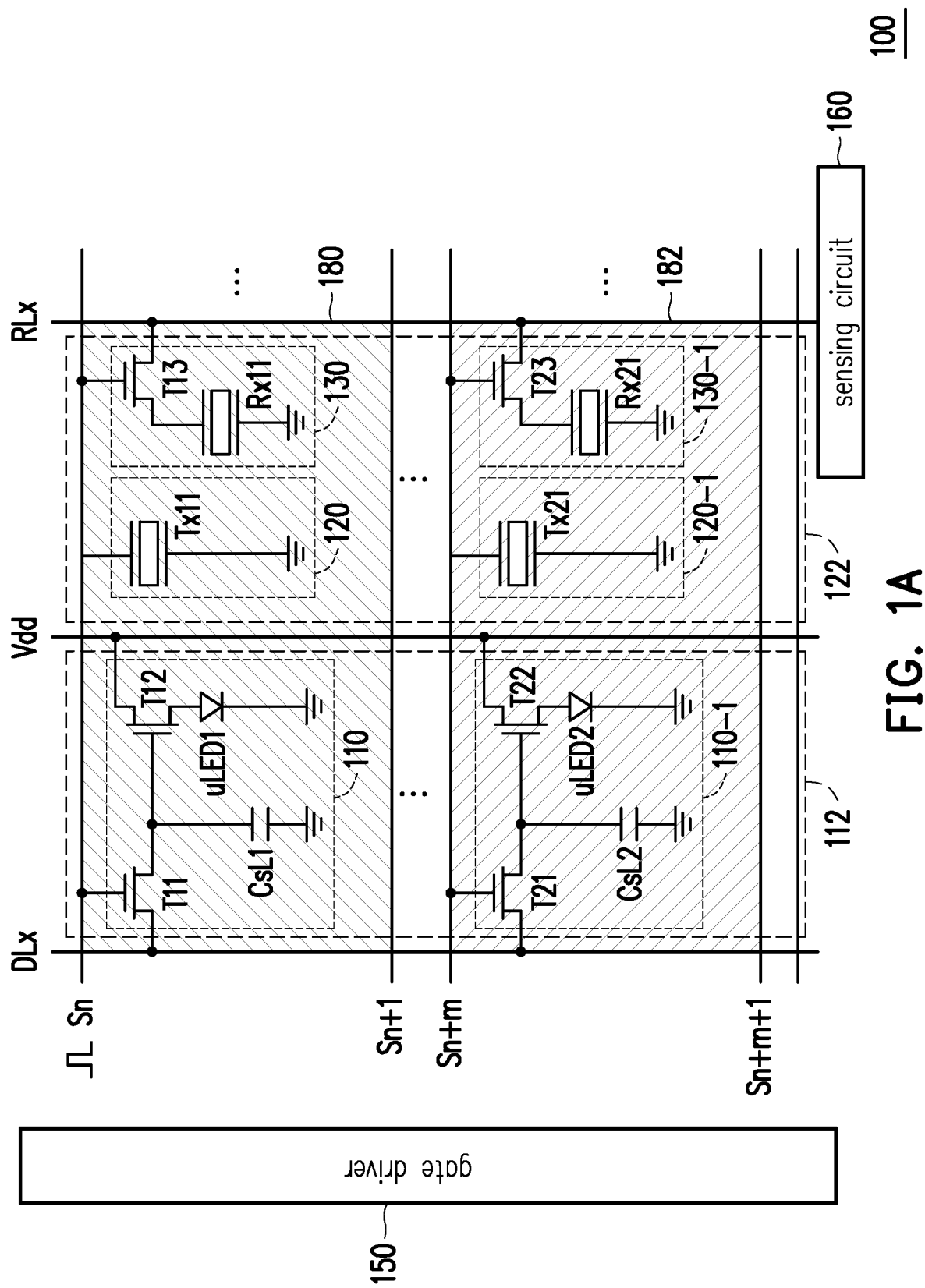
FIG. 1A is a circuit diagram of an electronic device according to a first embodiment of the invention.
Figure 1B:
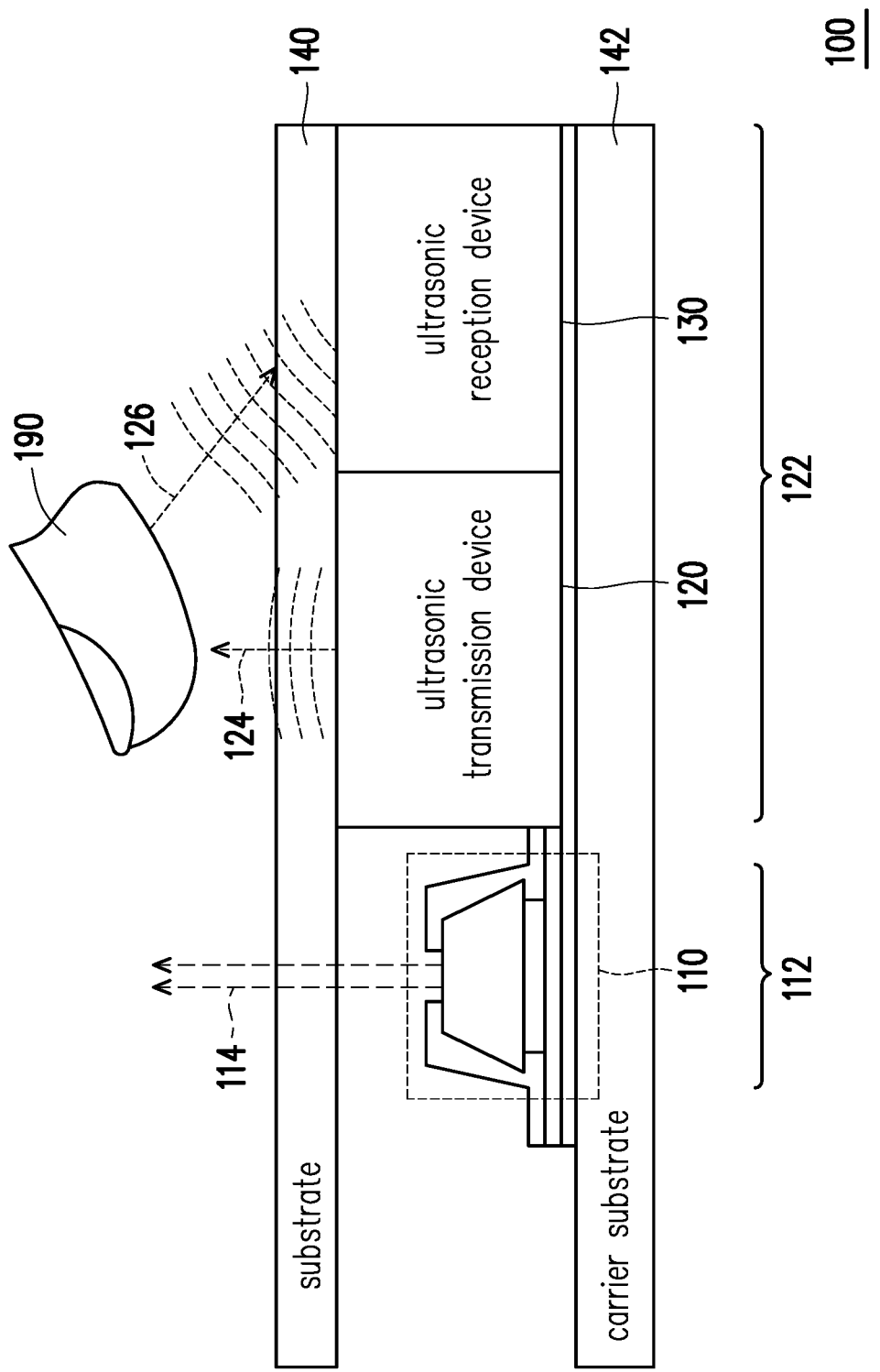
FIG. 1B is a schematic diagram of a display device, an ultrasonic transmission device, an ultrasonic reception device, and a substrate in the electronic device according to the first embodiment of the invention.

FIG. 1A is a circuit diagram of an electronic device 100 according to a first embodiment of the invention, and FIG. 1B is a schematic diagram of a display device 110, an ultrasonic transmission device 120, an ultrasonic reception device 130, and a substrate 140 in the electronic device 100 according to the first embodiment of the invention. FIG. 1A shows the arrangement positions of the relevant elements in the display plane of the electronic device 100, and FIG. 1B shows the arrangement positions of the elements in the cross-section of the relevant elements in the electronic device 100. The electronic device 100 of the present embodiment has a display function and an ultrasonic touch function and is, for example, a display panel/touch panel of a consumer electronic device (e.g., a smartphone, a tablet computer, and a notebook computer) or a display device having a touch function (e.g., a billboard and a television).

The electronic device 100 mainly includes a display device 110, an ultrasonic transmission device 120, an ultrasonic reception device 130, a substrate 140, an ultrasonic controller (e.g., a gate driver 150 in FIG. 1A), and a sensing circuit 160 (also referred to as a touch sensor). The display device 110 may be a micro LED device produced through the micro LED technique. In the present embodiment, the display device 110 shown in FIG. 1A is composed of two transistors (T11 and T12), a capacitor CsL1, and a micro LED uLED1. In other words, the display device 110 is a 2T1C structure. People implementing the present embodiment may adjust the above circuit structure of the display device 110 according to the requirements. For example, the display device 110 may be implemented as a 4T1C/5T1C/6T1C structure.

The ultrasonic transmission device 120 and the ultrasonic reception device 130 are disposed in parallel with respect to the horizontal direction of the substrate 140. The ultrasonic transmission device 120 in FIG. 1A includes an ultrasonic transmitter TX11. The ultrasonic reception device 130 in FIG. 1A includes a transistor T13 and an ultrasonic receiver RX11. One terminal of the transistor T13 is coupled to a reception line RLx, and another terminal of the transistor T13 is coupled to the ultrasonic receiver Rx11. The ultrasonic transmission device 120 and the ultrasonic reception device 130 are configured to be adjacent to the display device 110. In the present embodiment, each display device 110 in the electronic device 100 is used to display one color (e.g., red, green, or blue) in each pixel in the image. The display devices 110 are disposed in column arrangement in a display area 112 in FIG. 1A to present the display pixels of the entire column. The ultrasonic transmission device 120 and the ultrasonic reception device 130 located in a touch area 122 are disposed beside the display device 110 (or the plurality of display devices 110 for presenting the same pixel) in the display area 112. The display area 112 and the touch area 122 do not overlap each other. The substrate 140 is in direct contact with the ultrasonic transmission device 120 and the ultrasonic reception device 130.

The material of the substrate 140 includes glass, or the substrate 140 is made from glass as a material. The object to be detected (e.g., a finger 190) may contact one surface of the substrate 140, and the ultrasonic transmission device 120 and the ultrasonic reception device 130 are disposed on another surface of the substrate 140. A carrier substrate 142 may be a glass plate or another circuit board. The sensing circuit 160 is coupled to the ultrasonic reception devices 130 and 130-1 via the reception line RLx to receive a sensing signal generated therefrom, and determines the position where a touch occurs according to the sensing signal to generate a touch signal. Accordingly, people implementing the present embodiment can learn which point in the display plane is touched by the object to be detected based on the touch signal generated by the sensing circuit, and then perform a corresponding touch operation.

In the present embodiment, two pixel areas 180 and 182 among the pixel areas in one column are illustrated to present the display devices 110 and 110-1, the ultrasonic transmission devices 120 and 120-1, and the ultrasonic reception devices 130 and 130-1. The display device 110-1 includes two transistors T21 and T22, a capacitor CsL2, and a micro LED uLED2. The ultrasonic transmission device 120-1 includes an ultrasonic transmitter TX21. The ultrasonic reception device 130-1 includes a transistor T23 and an ultrasonic receiver RX21. The ultrasonic transmission device 120-1 and the ultrasonic reception device 130-1 are configured to be adjacent to the display device 110-1. People implementing the present embodiment may utilize the circuit structure in the pixel areas 180 and 182 to realize the display plane of the electronic device 100. Here, the embodiment mainly describes the pixel area 180 and the elements therein as examples, and the pixel area 182 and the elements therein operate in a manner similar to the pixel area 180 and the elements therein.

Here, it is assumed that the following relevant parameters in the electronic device 100 are adopted, and people implementing the present embodiment may adjust these parameters according to the requirements. The resolution of the display plane formed by the display devices 110 and 110-1 is 1920×1080; the update frequency of the display plane of the electronic device 100 is 60 Hz; the gate turn-on time of the display device 110 corresponding to each pixel is about 13 μs to 16 μs; the gate driver 150 in the electronic device 100 updates a row of display devices each time, and the turn-on time interval of two adjacent rows of micro display devices is about 0 μs to 5 μs. The propagation speed of ultrasonic wave in glass is 6000 m/s. Therefore, in the case where the thickness of the glass is 2 mm to 4 mm, the propagation time of ultrasonic wave through the glass is about 0.67 μs to 1.33 μs.

In particular, in the embodiments of the invention, the display device 110 realized by the micro LED technique, the ultrasonic transmission device 120, and the ultrasonic reception device 130 are integrated with each other and manufactured in the same semiconductor manufacturing process to save the installation cost. In detail, the display device 110 realized by the micro LED technique requires relevant semiconductor manufacturing process operations (e.g., a "crystal growth" operation) performed on a single crystal silicon material (e.g., a sapphire substrate), so that the light-emitting layer in the display device 110 can have better luminous efficiency. Then, the semiconductor manufacturing process transfers the completed display device 110 to the carrier substrate 142 (e.g., a glass substrate or another type of substrate) for subsequent processing. On the other hand, due to factors of the semiconductor manufacturing process, the ultrasonic transmission device 120 and the ultrasonic reception device 130 also need to be transferred from another substrate to another carrier substrate. Therefore, in the embodiments of the invention, the manufacturing processes of the display device 110, the ultrasonic transmission device 120, and the ultrasonic reception device 130 are integrated with each other, and a plurality of methods are designed to realize ultrasonic touch without affecting the display device.

In the first embodiment of FIG. 1A and FIG. 1B, by simultaneously turning on the ultrasonic transmission device 120 and the ultrasonic reception device 130 located in the same pixel area 180, the ultrasonic controller (the gate driver 150) determines whether a touch occurs based on whether the energy of the ultrasonic wave is absorbed by the object to be detected (e.g., the finger 190 of FIG. 1B, a touch stylus, etc.). In the present embodiment, the gate driver 150 is used as the ultrasonic controller to control the turn-on of the ultrasonic transmission device 120 and the ultrasonic reception device 130. The gate driver 150 provides corresponding scan signals (e.g., scan signals Sn to Sn+m+1) for each scan line in each display plane. According to the scan signal Sn, the display device 110 guides the voltage in a data line DLx to the capacitor CsL1 via the transistor T11 and controls the brightness of a light 114 emitted by the micro LED uLED1 through the transistor T12. In other words, the display device 110 displays the pixels in the image according to the scan signal Sn.

In the present embodiment, the display device 110, the ultrasonic transmission device 120, and the ultrasonic reception device 130 in the pixel area 180 are simultaneously turned on by using the scan signal Sn. In other words, the control signal of the present embodiment is the scan signal generated by the timing controller (e.g., the gate driver 150). The control terminal of the ultrasonic transmitter Tx11 is coupled to the scan signal Sn. The control terminal of the ultrasonic reception device 130 is also coupled to the scan signal Sn. In other words, when the scan signal Sn is enabled, the ultrasonic transmitter Tx11 in the ultrasonic transmission device 120 generates an ultrasonic wave (as indicated by arrow 124) in the direction toward the substrate 140 according to the control signal (the scan signal Sn). The ultrasonic reception device 130 simultaneously receives the ultrasonic wave (shown by arrow 126) through the substrate 140 according to the control signal (the scan signal Sn) and generates a sensing signal corresponding to the received ultrasonic wave. On the other hand, people implementing the present embodiment shall be aware that, in the present embodiment, the scan signal generated by the timing controller is used as the control signal, but in other embodiments, another signal may also be separately provided as the control signal of the ultrasonic transmission device 120 and the ultrasonic reception device 130, as long as the ultrasonic transmission device 120 and the ultrasonic reception device 130 are turned on simultaneously.

When the object to be detected (e.g., the finger 190) contacts the substrate 140, the ultrasonic wave energy emitted by the ultrasonic transmission device 120 is absorbed by the object to be detected (the finger 190), so that the ultrasonic reception device 130 which simultaneously turned on cannot receive ultrasonic wave that is reflected and has sufficient energy, and thereby the position where the touch occurs can be learned. In the transmission process of the ultrasonic wave, the ultrasonic wave undergoes different energy transmission losses at the time of reflection depending on the different objects to be detected. In other words, the interface between different objects to be detected and the glass vary in terms of the energy threshold of reflection of ultrasonic wave. The reflectivity of the ultrasonic wave at different medium interfaces is associated with the acoustic impedance.

The so-called "acoustic impedance" (represented as "Z") is associated with the speed (represented as "S") of the ultrasonic wave in the medium and the density of the medium itself (represented as "D"). The relationship may be expressed as Equation (1):

$$Z = \frac{S}{D} \tag{1}$$

For example, assuming that the acoustic impedance of a first medium is represented as "Z1", and the acoustic impedance of a second medium is represented as "Z2", then the reflectivity (represented as "R") of the interface formed by the first medium and the second medium may be expressed as Equation (2):

$$R = \frac{(Z1 - Z2)^2}{(Z1 + Z2)^2} \quad (2)$$

The transmittance (represented as "T") of the interface formed by the first medium and the second medium may be expressed as Equation (3):

$$T = \frac{4 \times Z1 \times Z2}{(Z1 + Z2)^2} \quad (3)$$

Here, a list of the commonly used media, the speed ("S") of ultrasonic wave in the medium, the density ("D") of the medium itself, and the acoustic impedance ("Z") is provided as an example:

TABLE 1

| Medium | S (M/S) | D (M/S) | Z (10^5) |
|---|---|---|---|
| Air | 331 | 0.00129 | 0.000042 |
| Glass | 6000 | 2.4 | 1.44 |
| Insulating adhesive | 1430 | 0.86 | 0.12298 |
| Iron/metal | 3400 | 7.8 | 2.652 |
| Water/human tissue fluid | 1430 | 1 | 0.143 |

The reflectivity ("R") and the transmittance ("T") of the interface between different media can be learned from the above media and the corresponding acoustic impedances, as presented in Table 2 below:

TABLE 2

| Interface | Medium | Acoustic impedance (Z) | Reflectivity (R) | Transmittance (T) |
|---|---|---|---|---|
| Interface 1 | Air | 0.000042 | 99.99% | 0.01% |
| | Glass | 1.44 | | |
| Interface 2 | Iron/Metal | 2.652 | 8.77% | 91.23% |
| | Glass | 1.44 | | |
| Interface 3 | Water/human tissue fluid | 0.143 | 67.13% | 32.87% |
| | Glass | 1.44 | | |

When the object to be detected does not contact the position where the ultrasonic transmission device 120 and the ultrasonic reception device 130 are located, since the interface reflectivity (i.e., the reflectivity of the interface 1) from glass to air is 99.99%, the ultrasonic wave emitted by the ultrasonic transmission device is almost completely reflected and is received by the ultrasonic reception device. In contrast, when the object to be detected contacts the position where the ultrasonic transmission device and the ultrasonic reception device are located, the interface reflectivity (i.e., the reflectivity of the interface 2) from glass to iron/metal is 8.77%, or the interface reflectivity (i.e., the reflectivity of the interface 3) from glass to water/human tissue fluid is 32.87%, which means that the energy of part of the ultrasonic wave is absorbed because the object to be detected (e.g., the touch stylus and the finger 190) formed of iron/metal or water/human tissue fluid is in contact with the glass. Therefore, the ultrasonic wave emitted by the ultrasonic transmission device 120 is not all reflected and only part of the ultrasonic wave is received by the ultrasonic reception device 130.

In the embodiments of the invention, the energy threshold may be set based on the above reflectivity, and the sensing circuit 160 may be used to compare the value of the sensing signal generated by the ultrasonic reception device 130 with the ultrasonic wave energy threshold to determine the position where the touch occurs. For example, the energy threshold may be adjusted to a value between 75% and 90%. When the value of the sensing signal is greater than the ultrasonic wave energy threshold, the sensing circuit 160 determines that no touch has occurred. When the value of the sensing signal is less than the ultrasonic wave energy threshold, the sensing circuit 160 determines that the position where the touch occurs is the position of the ultrasonic reception device 130 that generates the sensing signal.

Figure 2:
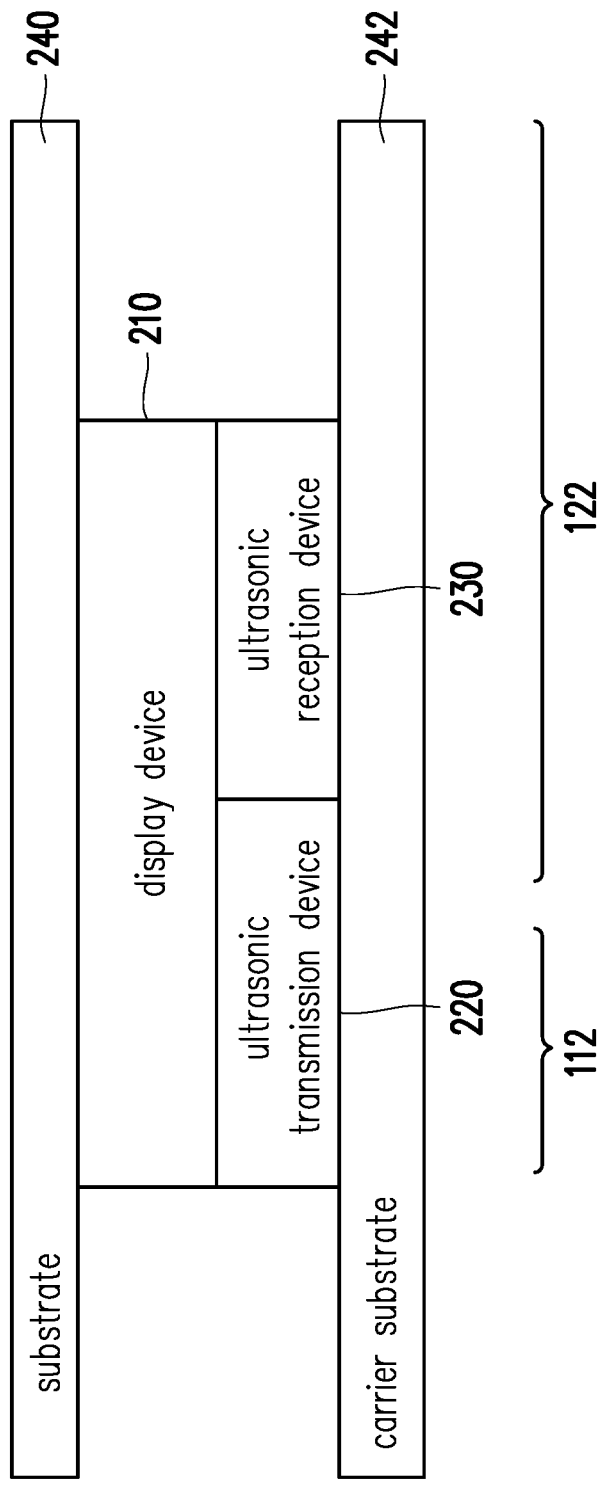
FIG. 2 is a schematic diagram of a display device, an ultrasonic transmission device, an ultrasonic reception device, a substrate, and a carrier substrate in an electronic device according to a second embodiment of the invention.

FIG. 2 is a schematic diagram of a display device 210, an ultrasonic transmission device 220, an ultrasonic reception device 230, a substrate 240, and a carrier substrate 242 in an electronic device 100 according to a second embodiment of the invention. The second embodiment is similar to the first embodiment, and the difference between the two lies in that the arrangement positions among the display device 110, the ultrasonic transmission device 120, and the ultrasonic reception device 130 in FIG. 1B are different from the arrangement positions among the display device 210, the ultrasonic transmission device 220, and the ultrasonic reception device 230 in FIG. 2. The ultrasonic transmission device 220 and the ultrasonic reception device 230 in FIG. 2 are still disposed to be adjacent to each other, but the display device 210 is disposed between the ultrasonic transmission device 220 and the ultrasonic reception device 230 and the substrate 240. Accordingly, the ultrasonic transmission device 220 and the ultrasonic reception device 230 do not block the light of the display device 210, and the ultrasonic transmission device 220 and the ultrasonic reception device 230 can still determine through the substrate 240 whether contact of the object to be detected (the finger 190) occurs.

Figure 3A:
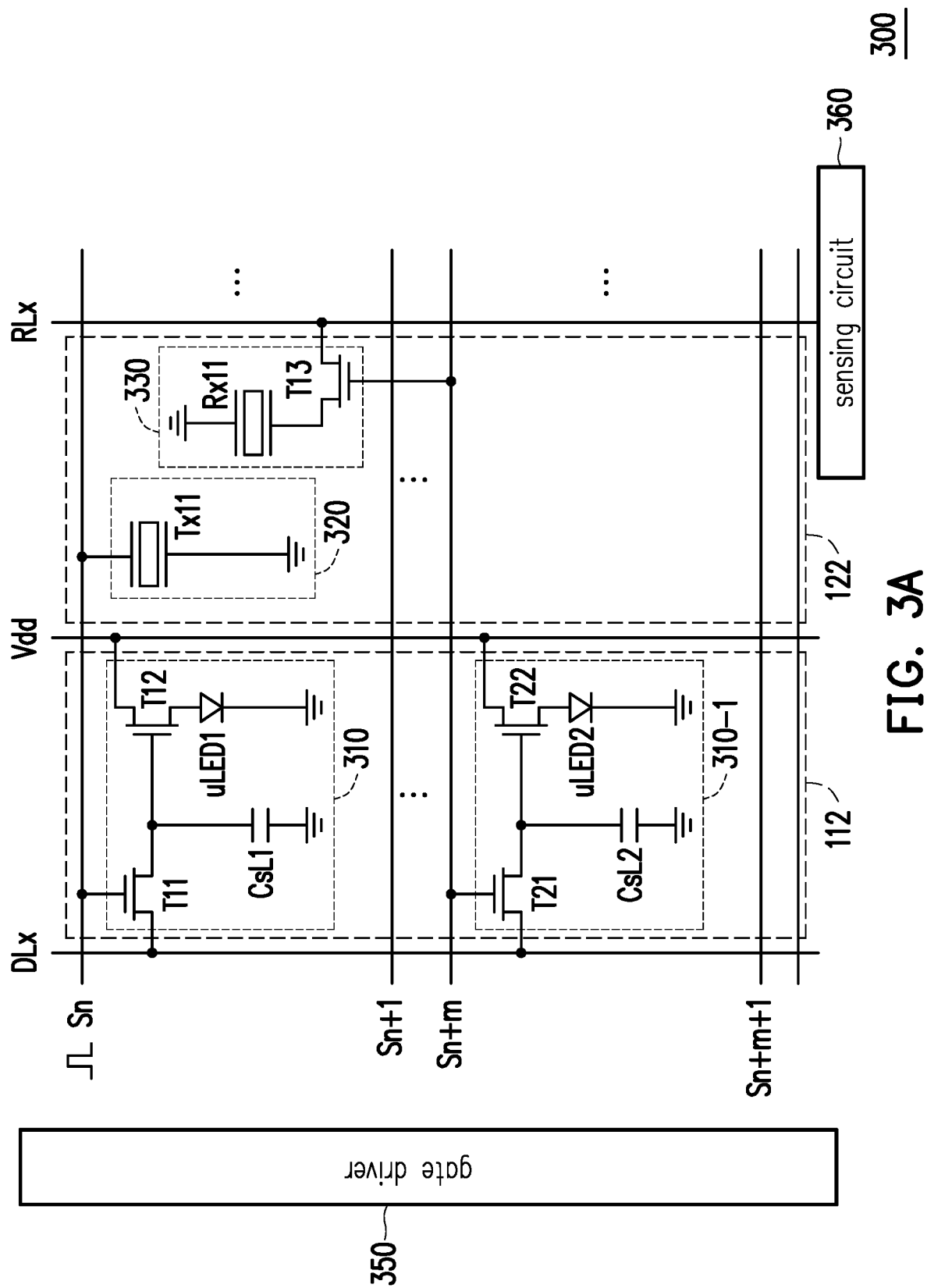
FIG. 3A is a circuit diagram of an electronic device according to a third embodiment of the invention.
Figure 3B:
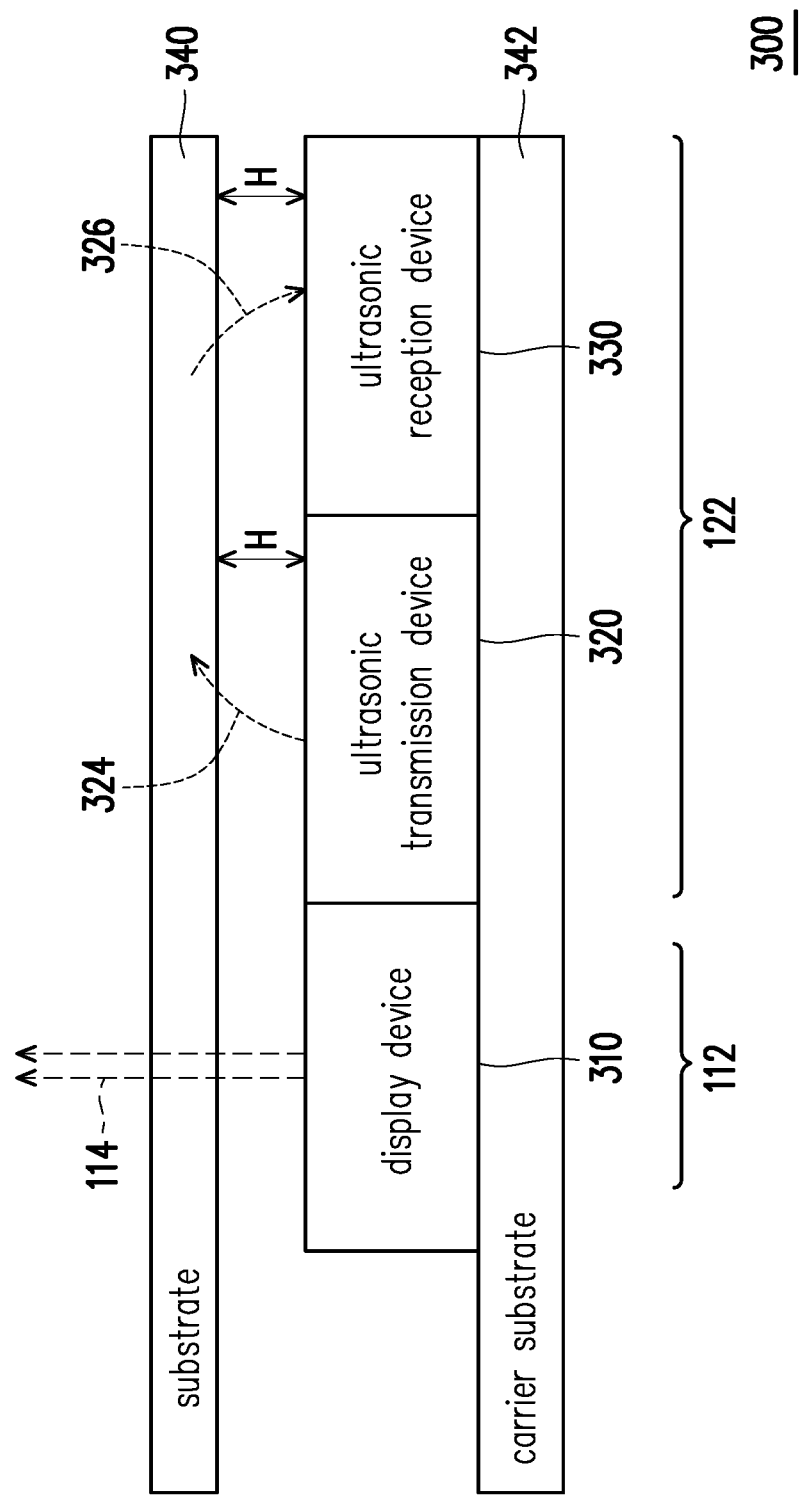
FIG. 3B and FIG. 3C are schematic diagrams of a display device, an ultrasonic transmission device, an ultrasonic reception device, and a substrate in the electronic device according to the third embodiment of the invention.
Figure 3C:
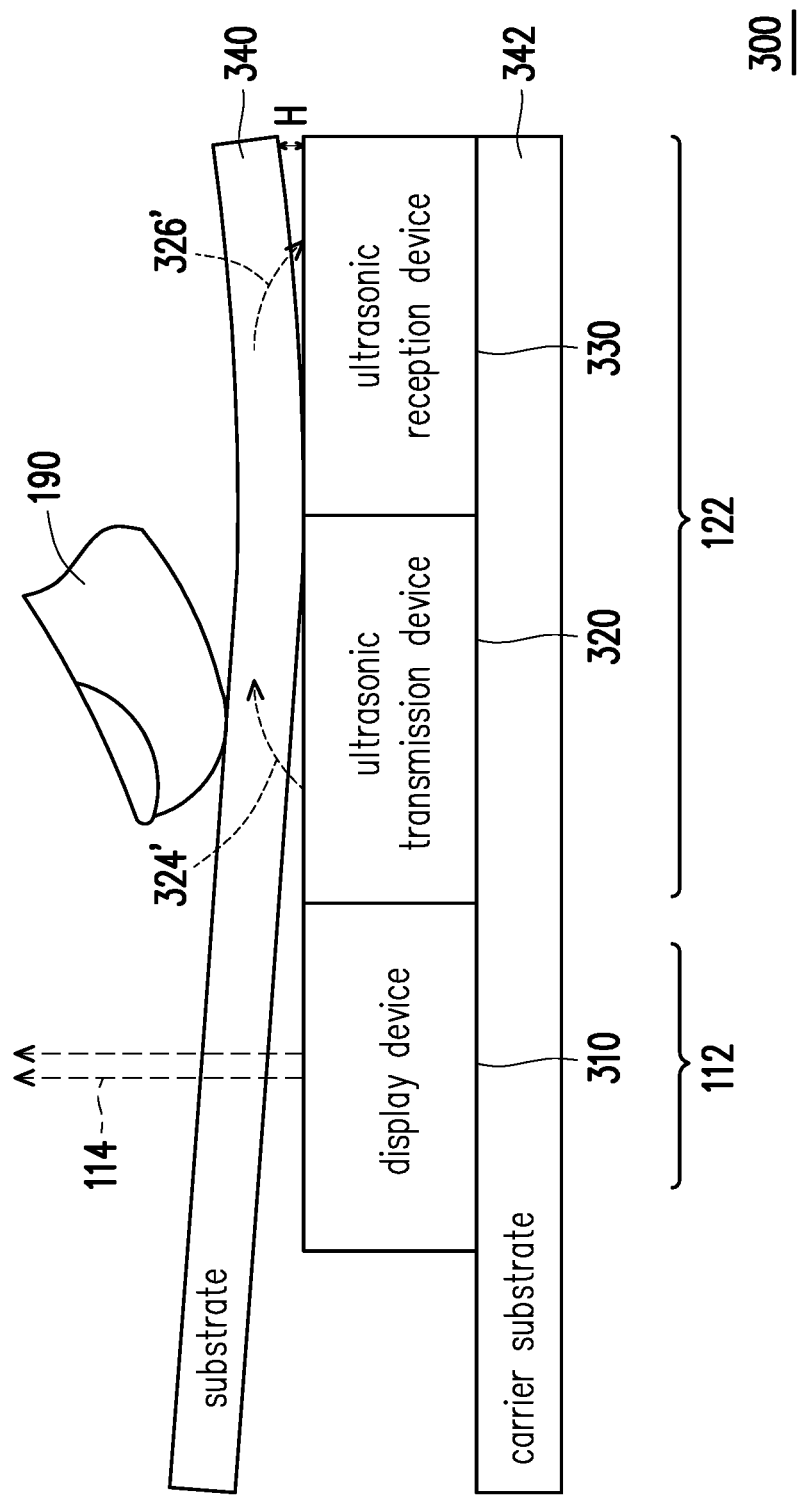

FIG. 3A is a circuit diagram of an electronic device 300 according to a third embodiment of the invention, and FIG. 3B and FIG. 3C are schematic diagrams of a display device 310, an ultrasonic transmission device 320, an ultrasonic reception device 330, and a substrate 340 in the electronic device 300 according to the third embodiment of the invention. The display device 310 and the ultrasonic transmission device 320 are both similar to the corresponding elements in the first embodiment. However, the arrangement relationship between the substrate 340 and the ultrasonic transmission device 320 and the ultrasonic reception device 330 (as shown in FIG. 3B and FIG. 3C) and the circuit configuration (as shown in FIG. 3A) of the ultrasonic reception device 330 are different from those in the first embodiment. The ultrasonic transmission device 320 and the ultrasonic reception device 330 in the third embodiment are designed to be turned on at different times. Due to deformation resulting from pressing on the substrate 340 by the object to be detected, the transmission path of the ultrasonic wave is changed, which affects whether the ultrasonic reception device 330 receives the ultrasonic wave emitted before a predetermined time. Thereby, it can be determined whether a touch occurs.

Here, the difference between the first embodiment and the third embodiment will be described in detail. Referring to FIG. 3A, an ultrasonic controller (a gate driver 350) in the electronic device 300 generates a plurality of scan signals (e.g., scan signals Sn to Sn+m+1). The gate driver 350 generates a first control signal (e.g., the scan signal Sn) at a first time point (e.g., a time Tn) and generates a second control signal (e.g., a scan signal Sn+m) at a second time point (e.g., a time Tn+m). The first time point Tn is different from the second time point Tn+m, and the first time point Tn is different from the second time point Tn+m by a predetermined time Tm. The ultrasonic transmission device 320 generates an ultrasonic wave according to the first control signal (the scan signal Sn). The ultrasonic reception device 330 receives the ultrasonic wave emitted by the ultrasonic transmission device 320 according to the second control signal (the scan signal Sn+m) and generates a sensing signal corresponding to the received ultrasonic wave. In other words, the control terminal of the transistor T13 in the ultrasonic reception device 330 is coupled to the scan signal Sn+m rather than the scan signal Sn. The ultrasonic transmission device 320 is not turned on at the second time point Tn+m. In other words, the ultrasonic transmission device 320 and the ultrasonic reception device 330 are designed to be turned on at different times, and the turn-on time of the ultrasonic reception device 330 is later than the turn-on time of the ultrasonic transmission device 320 by the predetermined time Tm.

Referring to FIG. 3B, FIG. 3B shows the case where the object to be detected (the finger 190) is not pressed, and the ultrasonic transmission device 320 and the ultrasonic reception device 330 are disposed to be adjacent to each other and have a deformation distance H with respect to the substrate 340. In the present embodiment, the "predetermined time" is designed to be a time interval in which the ultrasonic wave generated by the ultrasonic transmission device 320 at the first time point Tn reaches the substrate 340 (indicated by arrow 324) via the deformation distance H and is reflected (indicated by arrow 326) to the ultrasonic reception device 330, in the case where the object to be detected (the finger 190) does not press and deform the substrate 140 (FIG. 3B). This time interval is approximately equal to the predetermined time Tm. In other words, the ultrasonic wave generated by the ultrasonic transmission device 320 at the first time point Tn is received by the ultrasonic reception device 330 at the second time point Tn+m.

Referring to FIG. 3C, FIG. 3C shows the case where the object to be detected (the finger 190) presses the position, and the deformation distance H is reduced to less than a predetermined value. In the case where the deformation distance H becomes less than the predetermined value due to pressing on the substrate 340 by the object to be detected (the finger 190), the time in which the ultrasonic wave at the first time point Tn reaches the substrate 340 (indicated by arrow 324') from the ultrasonic transmission device 320 and is reflected (indicated by arrow 326') to the ultrasonic reception device 330 is less than the predetermined time Tm, which causes the ultrasonic wave to reach the ultrasonic reception device 330 in advance and then lose its energy. As a result, the ultrasonic reception device 330 cannot receive the ultrasonic wave at the second time point Tn+m. Accordingly, the sensing circuit 360 can receive the sensing signal of the ultrasonic reception device 330 via the reception line RLx and determine the position where the touch occurs based on the presence/absence of the sensing signal to generate the touch signal.

Figure 4A:
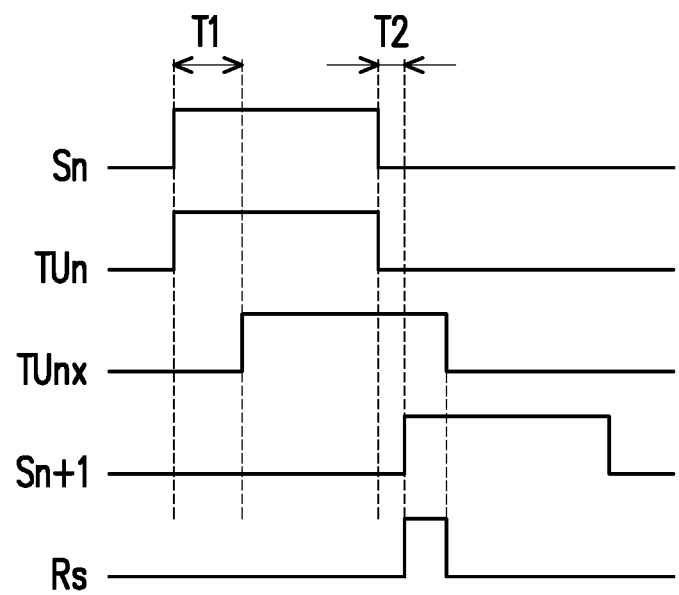
FIG. 4A and FIG. 4B are waveform diagrams of a plurality of signals according to the third embodiment of the invention.
Figure 4B:
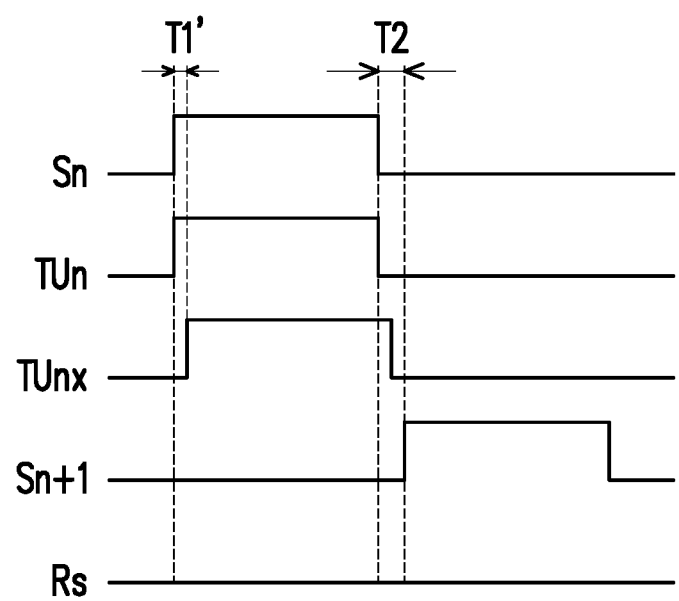

FIG. 4A and FIG. 4B are waveform diagrams of a plurality of signals according to the third embodiment of the invention. FIG. 4A and FIG. 4B show waveforms of the scan signal Sn, the scan signal Sn+1 (as an example of the scan signal Sn+m), an ultrasonic wave signal TUn generated by the ultrasonic transmission device 320, an ultrasonic wave signal TUnx transmitted to the ultrasonic reception device 330, and a sensing signal Rs on the reception line RLx. In the present embodiment, the predetermined time Tm by which the first time point Tn and the second time point Tn+m differ from each other is, for example, the time taken for passing through one scan line. In other words, the second time point Tn+m is equal to the time Tn+1. Here, the time interval of enabling the scan signals (e.g., Sn and Sn+1) between two adjacent scan lines is set as 3 μs, i.e., T2 shown in FIG. 4A. People implementing the present embodiment may adjust the above time interval according to the actual situation between the scan lines, for example, as 1 μs to 5 μs, etc.

Referring to FIG. 4A and FIG. 3B at the same time, when no object to be detected (the finger 190) presses the substrate 340, the scan signal Sn is turned on and the ultrasonic wave signal TUn is generated by the ultrasonic transmission device 320, and the ultrasonic wave signal TUn is transmitted to the ultrasonic reception device 330 via arrows 324 and 326 to become the ultrasonic wave signal TUnx. For example, a time delay T1 between the ultrasonic wave signal TUn and the ultrasonic wave signal TUnx is approximately 6.47 μs. On the other hand, the time T2 of enabling the scan signals between the two adjacent scan lines is 3 μs, and the time delay T1 is greater than the time T2. Therefore, when the scan signal Sn+1 is enabled, the ultrasonic reception device 330 receives a portion of the ultrasonic wave signal TUnx and enables the sensing signal Rs.

Referring to FIG. 4B and FIG. 3C at the same time, when the object to be detected (the finger 190) presses and deforms the substrate 340, the scan signal Sn is turned on and the ultrasonic wave signal TUn is generated by the ultrasonic transmission device 320, and the ultrasonic wave signal TUn is transmitted to the ultrasonic reception device 330 via arrows 324' and 326' to become the ultrasonic wave signal TUnx. Due to the decrease in the deformation distance H, a time delay T1' between the ultrasonic wave signal TUn and the ultrasonic wave signal TUnx is approximately 0.67 μs. On the other hand, the time T2 of enabling the scan signals between the two adjacent scan lines remains 3 μs. Therefore, the time delay T1' is less than the time T2. As a result, when the scan signal Sn+1 is enabled, the ultrasonic reception device 330 does not receive the ultrasonic wave signal TUnx, and thus the sensing signal Rs is not enabled.

Figure 5A:
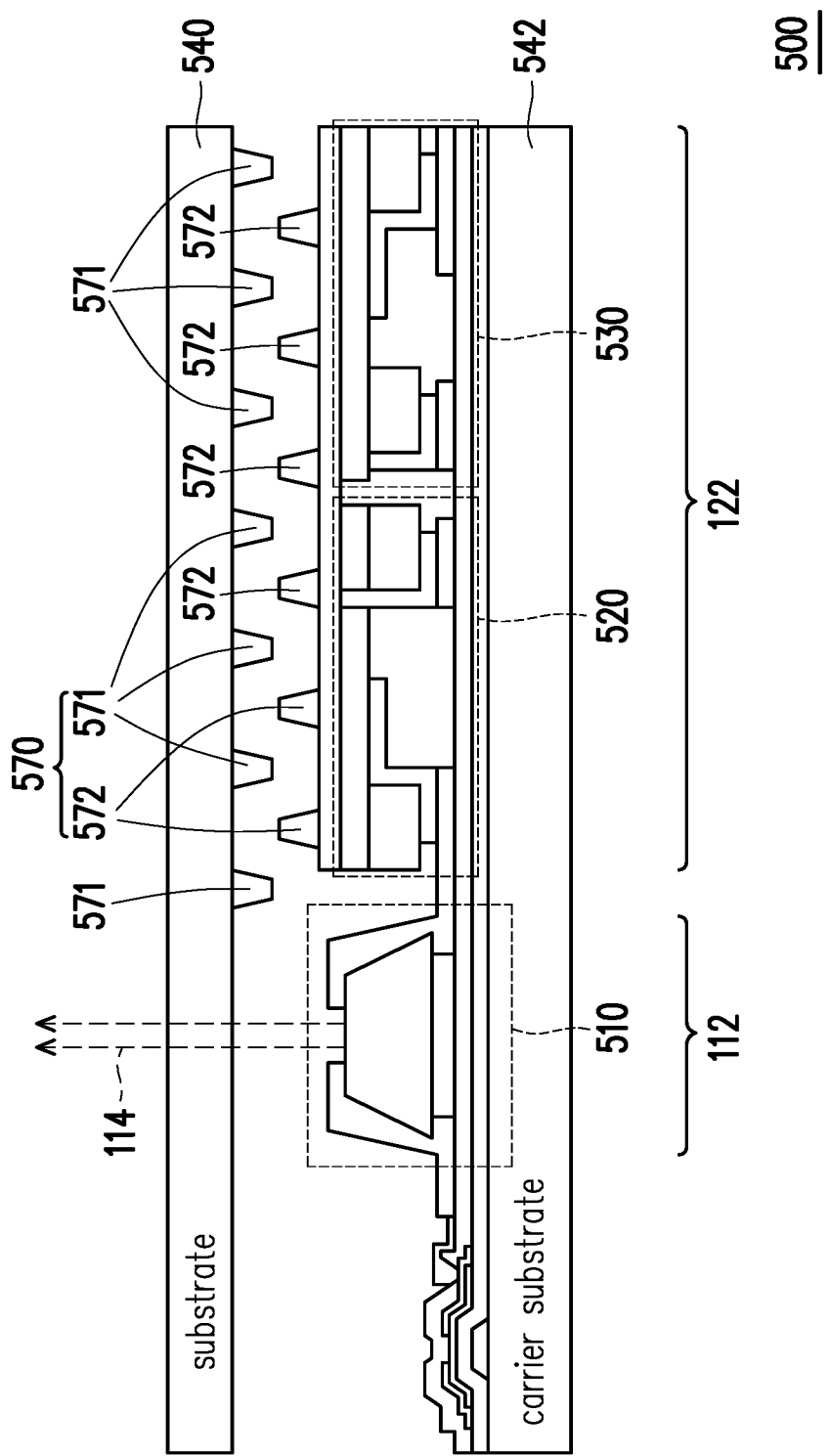
FIG. 5A to FIG. 5B are schematic diagrams of an electronic device according to a fourth embodiment of the invention.
Figure 5B:
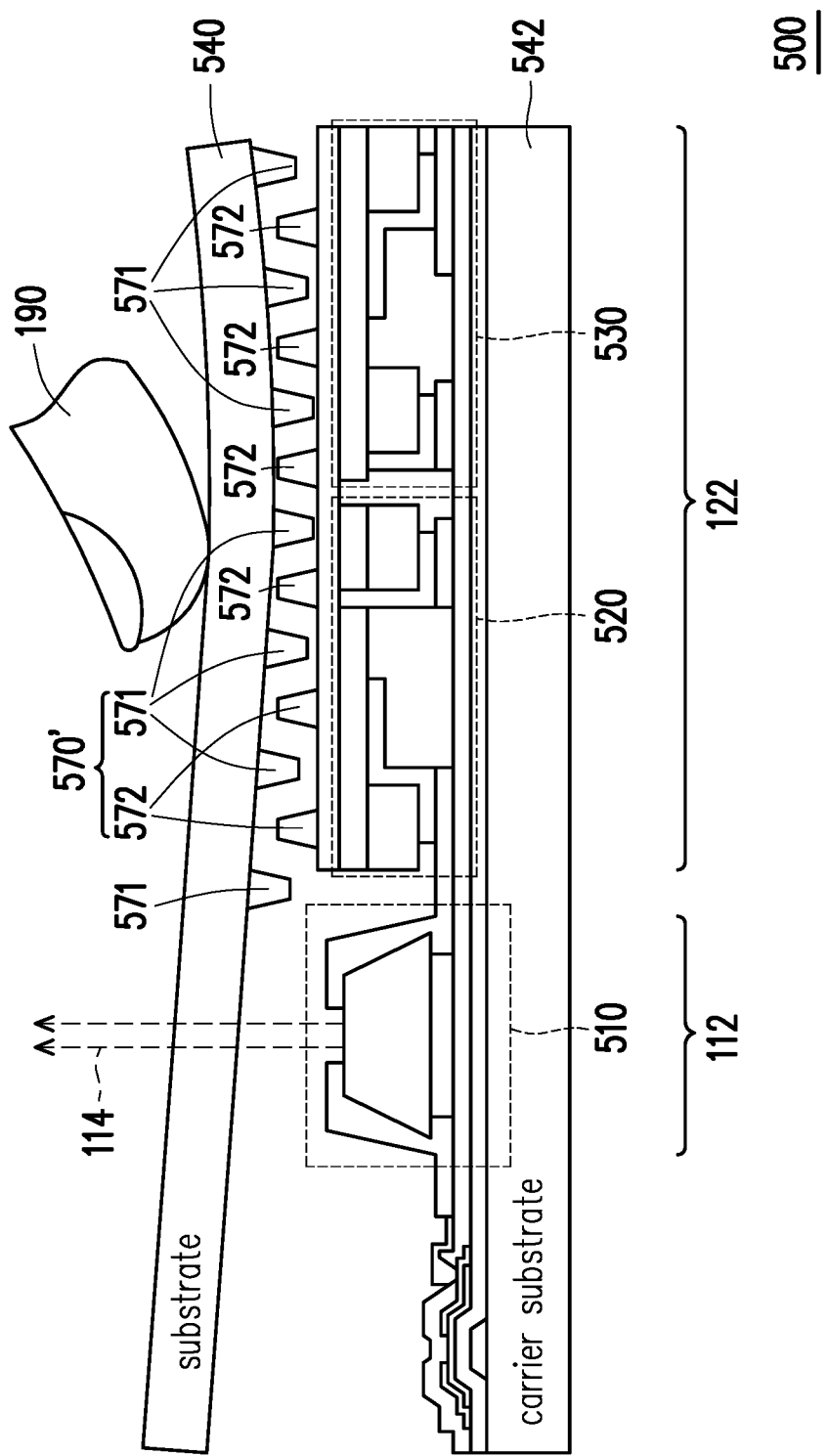

FIG. 5A to FIG. 5B are schematic diagrams of an electronic device 500 according to a fourth embodiment of the invention. Referring to FIG. 5A and FIG. 5B at the same time, a display device 510, an ultrasonic transmission device 520, an ultrasonic reception device 530, a substrate 540, and a carrier substrate 542 are all similar to the corresponding elements in the first embodiment. The main difference between the first embodiment and the fourth embodiment lies in that a pattern 570 (including a plurality of downward protruding patterns 571 and a plurality of upward protruding patterns 572) is disposed between the substrate 540 and the ultrasonic transmission device 520 and the ultrasonic reception device 530.

As shown in FIG. 5A, in the case where the substrate 540 is not pressed by the object to be detected (the finger 190), the ultrasonic wave generated by the ultrasonic transmission device 520 passes through the gap in the pattern 570 so that the ultrasonic reception device 530 generates a sensing signal having a first value. In contrast, as shown in FIG. 5B, in the case where the substrate 540 is pressed by the object to be detected (the finger 190), since the downward protruding patterns 571 and the upward protruding patterns 572 overlap with each other, the ultrasonic wave generated by the ultrasonic transmission device 520 undergoes diffraction (e.g., multi-slit diffraction) or interference based on a deformed pattern 570' (including the downward protruding patterns 571 and the upward protruding patterns 572), so that the energy distribution of the ultrasonic wave is different from that at the time when the touch does not occur. In other words, the downward protruding patterns 571 and the upward protruding patterns 572 overlap with each other and form a new pitch combination (for example, in the pattern 570', the distance between the downward protruding pattern 571 and the upward protruding pattern 572 that are adjacent to each other is 0.5 to 1.5 times the wavelength of the ultrasonic wave (preferably designed to be 1 time)), which causes multi-slit diffraction or interference in the ultrasonic wave. As a result, the ultrasonic reception device 530 generates a sensing signal having a second value based on the deformed pattern 570' and the ultrasonic wave. Accordingly, the sensing circuit corresponding to FIG. 5A and FIG. 5B determines the position where the touch occurs according to whether the sensing signal is the first value or the second value to generate the touch signal.

In FIG. 5A and FIG. 5B, a distance D1 between two adjacent downward protruding patterns 571 or a distance D2 between two adjacent upward protruding patterns 572 is preferably designed to be equal to a predetermined ratio (e.g., 2 times) of the wavelength of the ultrasonic wave. People implementing the present embodiment may adjust the predetermined ratio to 1.5 times to 2.5 times according to the requirements to similarly achieve the effect of the embodiments of the invention. For example, the transmission frequency of the ultrasonic wave may be designed to be 1000 MHz. If metal (e.g., iron) is adopted as the material of the pattern 570, the distance/pitch D1 between the downward protruding patterns 571 and the distance/pitch D2 between the upward protruding patterns 572 that are adjacent to each other may be designed to be 68.28 um. If insulating adhesive is adopted as the material of the pattern 570, the pitch D1 or pitch D2 may be designed to be 27.08 um. Under the above conditions, it is easy to cause multi-slit diffraction or destructive interference in the ultrasonic wave. Alternatively, the width of the downward protruding patterns 571 or the upward protruding patterns 572 may be designed to be equal to a predetermined ratio (e.g., 1 time) of the wavelength of the ultrasonic wave.

Figure 6A:
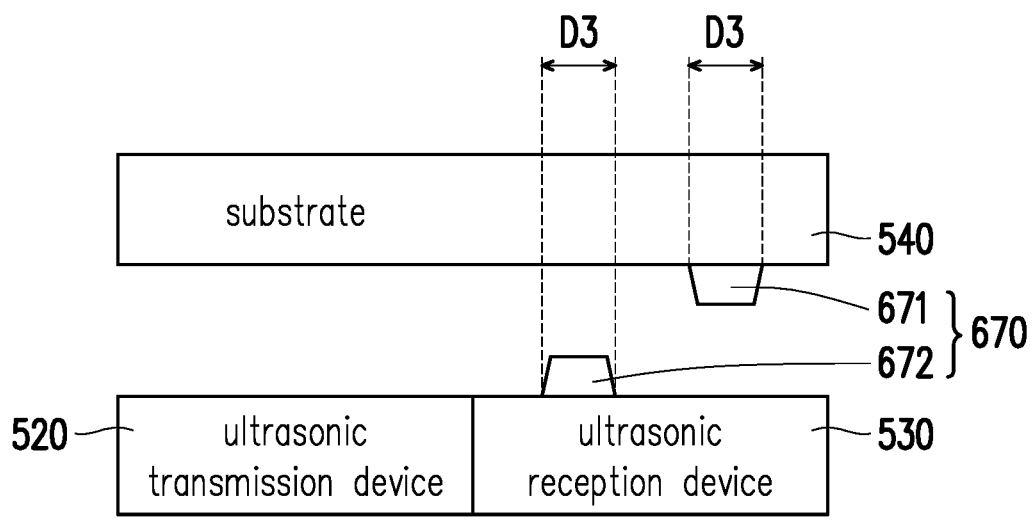
FIG. 6A, FIG. 6B, and FIG. 7 are schematic diagrams of a pattern of other types in the fourth embedment of the invention.
Figure 6B:
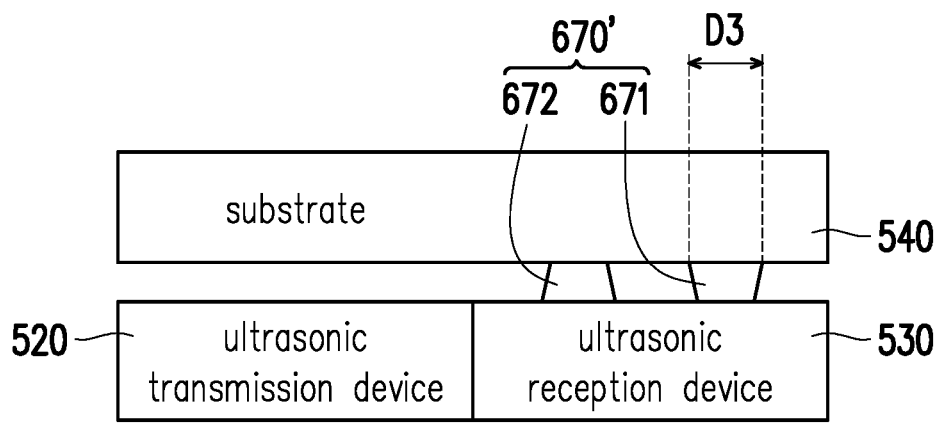

FIG. 6A and FIG. 6B are schematic diagrams of a pattern 670 of another type in the fourth embodiment of the invention. For convenience of illustration, FIG. 6A (before pressing by the object to be detected) and FIG. 6B (after pressing by the object to be detected) only schematically show the pattern (670 and 670') between the substrate 540 and the ultrasonic transmission device 520 and the ultrasonic reception device 530. In FIG. 6A and FIG. 6B, one single downward protruding pattern 671 and one single upward protruding pattern 672 are provided to form the pattern 670. A width D3 of the downward protruding pattern 671 or the upward protruding pattern 672 is both equal to a predetermined ratio (e.g., 1 time) of the wavelength of the ultrasonic wave. Accordingly, the pattern 670' can cause single-slit/multi-slit diffraction or interference in the ultrasonic wave, so that the energy distribution is different from that at the time when the touch does not occur. For example, the transmission frequency of the ultrasonic wave may be designed to be 1000 MHz. If metal (e.g., iron) is adopted as the material of the pattern 670, the width D3 may be designed to be 34.14 um. If insulating adhesive is adopted as the material of the pattern 670, the width D3 may be designed to be 13.54 um. Under the above conditions, it is easy to cause single-slit/multi-slit diffraction or interference in the ultrasonic wave.

Figure 7:
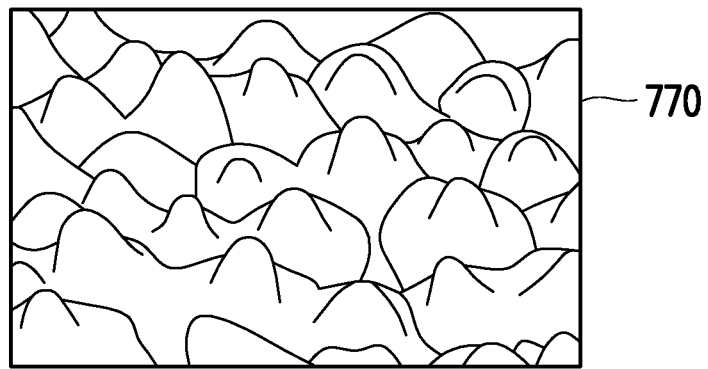

FIG. 7 is a schematic diagram of a pattern 770 of another type in the fourth embodiment of the invention. In addition to the forms in FIG. 5A to FIG. 5B and FIG. 6A to FIG. 6B, as the another pattern in the fourth embodiment, the pattern 770 presented in a three-dimensional structure shown in FIG. 7 may also be used to realize the downward protruding pattern or the upward protruding pattern in the pattern.

Figure 8:
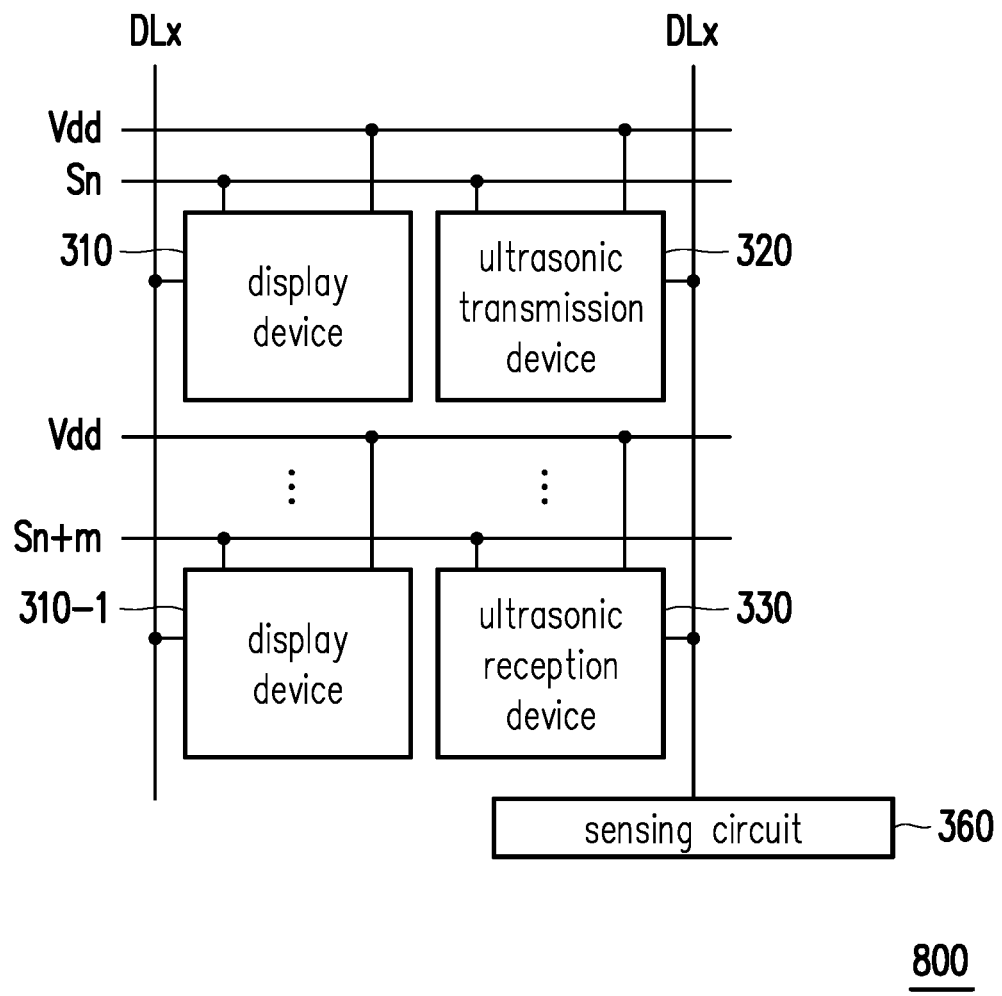
FIG. 8 is a circuit diagram of another electronic device according to the third embodiment of the invention.

FIG. 8 is a circuit diagram of another electronic device 800 according to the third embodiment of the invention. Different from FIG. 3A, in which the ultrasonic transmission device 320 and the ultrasonic reception device 330 are disposed in the same area, FIG. 8 shows that the ultrasonic transmission device 320 is disposed to be adjacent to the display device 310, and the ultrasonic reception device 330 is disposed to be adjacent to the display device 310-1. Accordingly, the ultrasonic transmission device 320 is controlled by the scan signal Sn and the ultrasonic reception device 330 is controlled by the scan signal Sn+m. Other relevant operations of the elements in FIG. 8 are as described in FIG. 3A and the third embodiment.

In summary of the above, the display device realized by the micro LED technique, the ultrasonic transmission device, and the ultrasonic reception device may be integrated with each other and manufactured in the same semiconductor manufacturing process. Therefore, in the embodiments of the invention, a plurality of methods are designed to control the ultrasonic transmission device and the ultrasonic reception device to realize ultrasonic touch without affecting the display device and meanwhile reduce the installation cost. In an embodiment, by simultaneously turning on the ultrasonic transmission device and the ultrasonic reception device, it is determined whether a touch occurs based on whether the energy of the ultrasonic wave is absorbed by the object to be detected (e.g., a finger, a touch stylus, etc.). In an embodiment, the ultrasonic transmission device and the ultrasonic reception device are designed to be turned on at different times. Due to deformation resulting from pressing on the glass substrate by the object to be detected, the transmission path of the ultrasonic wave is changed, which affects whether the ultrasonic reception device receives the ultrasonic wave emitted before a predetermined time. Thereby, it can be determined whether a touch occurs. In an embodiment, a pattern capable of causing diffraction or interference in the ultrasonic wave is disposed on the transmission path of the ultrasonic wave. Due to deformation resulting from pressing on the glass substrate by the object to be detected, the passage path is changed, and thereby, it can be determined whether the touch occurs based on the energy change of the ultrasonic wave.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device comprising:
   a plurality of pixel areas, wherein each of the pixel areas includes:
   a display device configured to display an image; and an ultrasonic transmission device and an ultrasonic reception device configured to be adjacent to the display device,
wherein the display devices respectively included in the pixel areas are disposed in column arrangement in a display area, the ultrasonic transmission devices and the ultrasonic reception devices respectively included in the pixel areas are disposed in a touch area, and the display area and the touch area do not overlap with each other;
a substrate configured to be adjacent to the ultrasonic transmission device and the ultrasonic reception device;
an ultrasonic controller coupled to the ultrasonic transmission device and the ultrasonic reception device and configured to generate a control signal, wherein the ultrasonic transmission device generates an ultrasonic wave in a direction toward the substrate according to the control signal, and the ultrasonic reception device simultaneously receives the ultrasonic wave according to the control signal through the substrate and generates a sensing signal corresponding to the received ultrasonic wave; and
a sensing circuit coupled to the ultrasonic reception device to receive the sensing signal and determine a position where a touch occurs according to the sensing signal to generate a touch signal.

2. The electronic device according to claim 1, wherein the display device is a micro LED device, and a material of the substrate comprises glass.

3. The electronic device according to claim 1, wherein the substrate is in direct contact with the ultrasonic transmission device and the ultrasonic reception device.

4. The electronic device according to claim 1, wherein the sensing circuit compares a value of the sensing signal generated by the ultrasonic reception device with an ultrasonic wave energy threshold to determine a position where the touch occurs,
wherein when the value of the sensing signal is greater than the ultrasonic wave energy threshold, the sensing circuit determines that the touch does not occur, and
when the value of the sensing signal is less than the ultrasonic wave energy threshold, the sensing circuit determines that the position where the touch occurs is a position of the ultrasonic reception device that generates the sensing signal.

5. The electronic device according to claim 1, wherein the control signal is a scan signal generated by a timing controller, wherein the display device displays the image according to the scan signal.

6. The electronic device according to claim 1, wherein the display device, the ultrasonic transmission device, and the ultrasonic reception device are manufactured in a same semiconductor manufacturing process.

* * * * *